Figure 1:
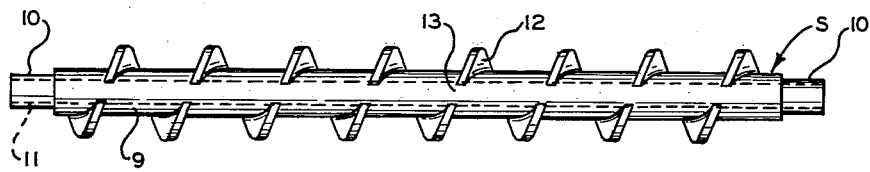

Aug. 11, 1964     C. K. SCHERPING     3,143,768
FLIGHTED TEMPERATURE CONTROLLED MIXER SHAFT
Filed Sept. 20, 1961

*INVENTOR.*
CLARENCE K. SCHERPING
BY

ATTORNEYS

United States Patent Office 3,143,768
Patented Aug. 11, 1964

3,143,768
FLIGHTED TEMPERATURE CONTROLLED
MIXER SHAFT
Clarence K. Scherping, Saginaw, Mich., assignor to Baker Perkins Inc., Saginaw, Mich., a corporation of New York
Filed Sept. 20, 1961, Ser. No. 139,464
9 Claims. (Cl. 18—12)

This invention relates to mixer shafts for mixing machines of the type employed for the continuous mixing and extruding of plastic and like materials. A shaft of the general character to which I refer is disclosed in applicant's assignee's Patent No. 3,023,455, entitled Mixers. Since the temperatures at which many materials are to be mixed are highly critical it is desirable, and in many instances necessary, that the mixer shaft and the advancing and mixing flights thereon circulate a temperature controlling fluid. This circulation is usually in addition to the circulation of fluid which takes place in the jacket surrounding the mixing chamber.

Dependent upon the particular mixing operation for which the machine is to be employed, the shaft, briefly, comprises an axially extending, elongate, hollow tube on which helically arranged, circumferentially spaced apart flights are fixed in position, the relative positions or lead of the flights and the gap between them varying dependent upon specifications for a particular machine. In one case, for instance, the gap between the flights or teeth may be measured in thousandths of an inch (.039" in one case) and, with heat tending to expand the blades, control of the temperature of the flights is highly important for an additional reason.

It has been determined that the procedure of drilling radial holes at spaced apart intervals down the length of the shaft and welding hollow flights in position over the holes is expensive and creates various problems. For instance, the considerable amount of welding necessary at the bases of the flights tends to cause shrinkage of the shaft or axle, affecting the pitch of the flights, and further tends to warp the relatively thin flights themselves. Also, it is difficult to be sure that the radially drilled circulation holes will remain unplugged when the flights are welded in position. Further, the templates which must be employed for drilling the radial circulation holes in the shaft and the flight welding fixture which is employed in such a procedure will both need to extend the full length of the shaft and would necessarily be very expensive.

A prime object of the present invention is to provide a new mixer shaft, formed in a novel and different manner, which obviates the problems mentioned. The shaft of the present invention can be economically fabricated in a relatively simple manner without the need of expensive templates and fixtures, or any necessity of straightening the 45 to 75 flights which are normally provided on such a shaft and might be warped during welding of the flights to the base. Briefly, the present invention is concerned with a shaft having integral flights which can be radially bored to communicate with the shaft bore and cut away to provide seats for welded closure plate means which are machined with the peripheral surface of the flights to the tolerances required.

A further object of the invention is to provide a shaft, in which the dynamic balance of the shaft is not affected during the forming of the shaft.

Figure 2:
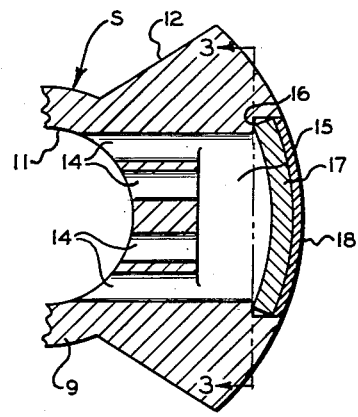
Figure 3:
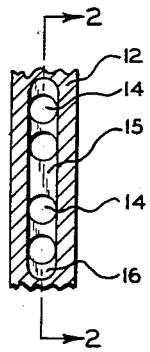
Figure 4:
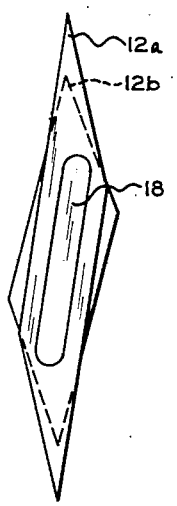

Other objects and advantages of the invention will be pointed out specifically or will become apparent from the following description when it is considered in conjunction with the appended claims and the accompanying drawings, in which:

FIGURE 1 is a side elevational view of a typical mixer shaft;
FIGURE 2 is an enlarged, fragmentary, transverse sectional view through one of the mixer shaft flights;
FIGURE 3 is a sectional plan view taken on the line 3—3 of FIGURE 2; and
FIGURE 4 is a top plan view of the flight.

Referring now more particularly to the accompanying drawings, which depict a preferred form of the invention only, a letter S generally indicates a mixer shaft which is shown as having an axle portion 9 with reduced ends 10 and a through bore 11 which communicates with a source of temperature controlled fluid at one end and recirculates the fluid to the source at its other end. An interrupted flight arrangement is shown which comprises flights 12 in helical arrangement separated by gaps 13. As disclosed in the aforementioned co-pending application, the mixer shaft S is both reciprocated and revolved to provide a more effective mixing or homogenization of the materials.

It will be noted that the flights 12 are relatively narrow (FIGURE 4) and because of this narrowness are difficult to cool or heat, as the case may be, since it is difficult to circulate a sufficient body of fluid through them. The flights have convergent outer and inner end edge portions 12a and 12b, respectively.

The shaft of the present invention is formed in the first place with integral flights 12 which in the present method of forming the shaft are as a first step finally cut to proper tolerances. This machining operation will, of course, provide the desired gaps 13 between them. Thence, utilizing an inexpensive template for an individual flight, openings 14 are drilled radially in the flight 12 from the outer peripheral surface to the bore 11. A slot portion is then cut from the outer periphery of the flight to connect the ports or passages 14 and provide a temperature controlling fluid chamber 15 of substantial length within the flight. It is desirable that this chamber 15 be of considerable length because it must necessarily be relatively narrow.

The flight 12 is thence provided with an axially enlarged recess 16 which seats an arcuate plug plate 17 as shown, the plug plate 17 being so dimensioned as to be snugly received within the recess 16 and having an arch or curvature corresponding to the curvature of the other peripheral surface of the flight. After this, material 18 is welded into position over the plate 17 to build it to the outer peripheral level of the flight and fix the plate 17 securely in position. This welding at the top of the flights has no material effect on the flights from the standpoint of warpage and, since it is performed remotely from the axle 9, does not tend to shrink the axle 9. Finally, the outer diameter of the axle 9 and the flights 18 can be turned to tolerance limits.

The present invention provides a highly satisfactory shaft formed in a very inexpensive manner. The shaft S is generally formed of stainless steel and the weld material is then stainless steel rod.

I claim:
1. A temperature controlled mixer shaft comprising; an elongate, hollow shaft having relatively narrow, interrupted integral flights thereon; at least one flight having at least one radial opening extending from its radially outer end to the open interior of said shaft; and means including weld material closing the opening at the outer periphery of said flight.

2. A temperature controlled mixer shaft comprising; an axially extending, elongate shaft having an axially extending opening providing a fluid supply passage; a series of interrupted helical flights integral with said shaft; each flight having a series of axially spaced apart, parallel openings extending radially from the axial opening in the shaft toward the outer periphery of said flights; each flight having a first recess spanning the endmost openings extending from substantially the outer periphery of the flight to a point generally radially midway of the flight; each flight having also a further enlarged second recess in its outer periphery relative to said first recess centered with respect to and communicating with said first recess; an arcuate plate snugly fitting in said second recess; and weld material building up said plate to the outer peripheral surface of said flight and fixing said plate in position.

3. A temperature controlled mixer shaft comprising: an elongate, hollow shaft having relatively narrow interrupted flights integrally provided thereon; said flights having radial openings extending from their radially outer ends to the open interior of said shaft; and plug means in the said outer ends of said flights flush with the surrounding surface of the flights closing the said openings.

4. A temperature controlled mixer shaft comprising; an axially extending, elongate shaft having an axially extending opening providing a fluid supply passage; a series of interrupted helical flights integral with said shaft; each flight having at least one opening extending radially from the axial opening in the shaft to the outer periphery of the flight; each flight having also an enlarged recess centered with respect to and communicating with said opening; an arcuate plate snugly fitting in said recess; and weld material building up said plate to the outer peripheral surface of said flight and fixing said plate in position.

5. A temperature controlled mixer shaft comprising; an axially extending, elongate shaft having an axially extending opening providing a fluid supply passage; a series of interrupted helical flights integral with said shaft; each flight having an opening extending radially from the axial opening in the shaft to the outer periphery of the flight; a plate snugly fitting in each opening; and weld material building up said plate to the outer peripheral surface of said flight and fixing said plate in position.

6. A temperature controlled mixer shaft comprising; an axially extending, elongate shaft having an axially extending opening providing a fluid supply passage; a series of interrupted helical flights integral with said shaft; each flight having a bore extending radially from the axial opening in the shaft toward the outer periphery of the flight; each flight having an enlarged opening communicating with said bore extending from substantially the outer periphery of the flight to a point generally radially midway of the flight; each flight having also a further enlarged recess centered with respect to and communicating with said enlarged opening; an arcuate plate snugly fitting in said recess; and weld material building up said plate to the outer peripheral surface of said flight and fixing said plate in position.

7. A temperature controlled mixer shaft comprising; an axially extending, elongate shaft having an axially extending opening providing a fluid supply passage; the shaft being formed with a series of substantially imperforate interrupted helical flights integral with said shaft; each flight being solid except for opening means cut in radially from the outer end of the flight to the axial opening in the shaft; and plug means closing only the outer portion of each opening means and flush with the surface of the flight.

8. A temperature controlled mixer shaft comprising; an axially extending, elongate shaft having an axially extending opening providing a fluid supply passage; a series of interrupted helical flights integral with said shaft; each flight having at least one bore extending radially from the axial opening in the shaft toward the outer periphery of the flight; each flight having an enlarged opening communicating with said bore extending from substantially the outer periphery of the flight to a point generally radially midway of the flight; and plug means flush with the outer peripheral surface of said flight and fixed in position to close each enlarged opening.

9. A temperature controlled mixer shaft comprising: an elongate, hollow shaft having relatively narrow, integral flights thereon; at least one flight having at least one radial opening extending from its radially outer end to the open interior of said shaft; and means including weld material closing the opening at the outer periphery of said flight, the outer periphery of said flight being recessed at said opening over an area greater in size than said opening; and said means comprising a plate fitting in said recess with weld material fixing said plate in the recess, the weld material being flush with the outer periphery of said flight.

References Cited in the file of this patent

UNITED STATES PATENTS

| | | |
|---|---|---|
| 361,998 | Green | Apr. 26, 1887 |
| 372,950 | Wilson | Nov. 8, 1887 |
| 790,467 | Valerius | May 23, 1905 |
| 1,951,427 | Lodge | Mar. 20, 1934 |
| 2,135,325 | Burt et al. | Nov. 1, 1938 |
| 2,530,503 | Bonham | Nov. 21, 1950 |
| 2,733,898 | Christian | Feb. 7, 1956 |
| 2,886,902 | Christian | May 19, 1959 |
| 3,056,588 | Alexandrovsky | Oct. 2, 1962 |